United States Patent
Yeung et al.

(10) Patent No.: US 10,708,597 B2
(45) Date of Patent: Jul. 7, 2020

(54) TECHNIQUES FOR EXTRAPOLATING IMAGE FRAMES

(71) Applicant: Microsoft Technology Licensing, LLC, Redmond, WA (US)

(72) Inventors: Andrew Zicheng Yeung, Redmond, WA (US); Michael George Boulton, Seattle, WA (US); Ashraf Ayman Michail, Kirkland, WA (US); Matt Bronder, Kirkland, WA (US); Jack Andrew Elliott, Seattle, WA (US); Matthew David Sandy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 15/886,448

(22) Filed: Feb. 1, 2018

(65) Prior Publication Data

US 2019/0238854 A1    Aug. 1, 2019

(51) Int. Cl.
| | |
|---|---|
| *H04N 19/139* | (2014.01) |
| *G06T 17/20* | (2006.01) |
| *G06T 15/04* | (2011.01) |
| *G06T 13/80* | (2011.01) |
| *G06T 11/00* | (2006.01) |

(52) U.S. Cl.
CPC ............ *H04N 19/139* (2014.11); *G06T 11/00* (2013.01); *G06T 13/80* (2013.01); *G06T 15/04* (2013.01); *G06T 17/20* (2013.01)

(58) Field of Classification Search
CPC ....... H04N 19/139; G06T 11/00; G06T 13/80; G06T 15/04; G06T 17/20
See application file for complete search history.

(56) References Cited

U.S. PATENT DOCUMENTS

| | | | |
|---|---|---|---|
| 6,046,744 A | 4/2000 | Hoppe | |
| 6,047,088 A | 4/2000 | van Beek et al. | |
| (Continued) | | | |

FOREIGN PATENT DOCUMENTS

| | | | |
|---|---|---|---|
| KR | 20030073100 A | | 9/2003 |
| KR | 100919886 B1 | * | 9/2009 |

OTHER PUBLICATIONS

Chen, et al., "The Video Mesh: A Data Structure for Image-based Three-dimensional Video Editing", In Proceedings of IEEE International Conference on Computational Photography, Apr. 8, 2011, 8 Pages.

*Primary Examiner* — Maria E Vazquez Colon
(74) *Attorney, Agent, or Firm* — Newport IP, LLC; Han Gim

(57) ABSTRACT

Examples described herein generally relate to performing frame extrapolation in image frame rendering. A vertex mesh as a set of vertices is generated, and each vertex is mapped to a screen space position for defining a texture. One or more motion vectors for one or more regions in a first image frame of a stream of image frames can be determined. The screen space positions associated with at least a portion of the set of vertices within the texture can be modified based at least in part on the one or more motion vectors. A graphics processing unit (GPU) can render the first image frame into the texture. The extrapolated image frame is displayed after the first image frame and before a next image frame in the stream of image frames.

20 Claims, 5 Drawing Sheets

(56) References Cited

U.S. PATENT DOCUMENTS

| | | |
|---|---|---|
| 7,502,413 B2 | 3/2009 | Robert et al. |
| 7,616,782 B2 | 11/2009 | Badawy |
| 7,847,823 B2 | 12/2010 | Habuka et al. |
| 8,223,831 B2 | 7/2012 | Lertrattanapanich et al. |
| 9,426,414 B2 | 8/2016 | Dane et al. |
| 10,147,226 B1* | 12/2018 | Chen .................. G06T 3/0031 |
| 2008/0095237 A1* | 4/2008 | Hussain ................ G06T 15/04 375/240.16 |
| 2008/0309666 A1* | 12/2008 | Chen .................... G06T 15/20 345/422 |
| 2018/0286105 A1* | 10/2018 | Surti ................... H04N 5/3696 |
| 2019/0037244 A1* | 1/2019 | Melkote Krishnaprasad ............. H04N 19/167 |

* cited by examiner

TECHNIQUES FOR EXTRAPOLATING IMAGE FRAMES

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. Display devices typically support one or more frame rates, such as 30 frames per second (fps), 60 fps, 120 fps, etc., and the computing devices may be configured to render images at a different frame rate, which may be based on processing capabilities of the computing device (e.g., processing speed of the GPU and/or central processing unit (CPU), memory capacity, etc.). In one example, the computing device may support a frame rate that is less than that supported by the display device. Thus, display of images rendered by the computing device may not be performed at the full potential of the display device.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for performing frame extrapolation in image frame rendering is provided. The method includes generating a vertex mesh as a set of vertices, mapping each vertex in the set of vertices to a screen space position for defining a texture, determining one or more motion vectors for one or more regions in a first image frame of a stream of image frames, where the one or more motion vectors represent motion of the one or more regions from a previous image frame in the stream of image frames, and modifying screen space positions associated with at least a portion of the set of vertices within the texture based at least in part on the one or more motion vectors. The method also includes rendering, by a graphics processing unit (GPU), the first image frame into the texture, such that a pixel position of one or more pixels in the image frame are moved based at least in part on the screen space positions of at least the portion of the set of vertices within the texture as modified, to generate an extrapolated image frame, and displaying the extrapolated image frame after the first image frame and before a next image frame in the stream of image frames.

In another example, a computing device for performing frame extrapolation in image frame rendering is provided. The computing device includes a memory storing one or more parameters or instructions for executing an operating system and one or more applications, a display interface coupled with a display device for communicating signals to display images on the display device, and at least one processor coupled to the memory and the display interface. The at least one processor is configured to generate a vertex mesh as a set of vertices, map each vertex in the set of vertices to a screen space position for defining a texture, determine one or more motion vectors for one or more regions in a first image frame of a stream of image frames, where the one or more motion vectors represent motion of the one or more regions from a previous image frame in the stream of image frames, and modify screen space positions associated with at least a portion of the set of vertices within the texture based at least in part on the one or more motion vectors. The at least one processor is also configured to render, by a graphics processing unit (GPU), the first image frame into the texture, such that a pixel position of one or more pixels in the image frame are moved based at least in part on the screen space positions of at least the portion of the set of vertices within the texture as modified, to generate an extrapolated image frame, and displaying the extrapolated image frame after the first image frame and before a next image frame in the stream of image frames.

In another example, a computer-readable medium, including code executable by one or more processors for performing frame extrapolation in image frame rendering, is provided. The code includes code for generating a vertex mesh as a set of vertices, mapping each vertex in the set of vertices to a screen space position for defining a texture, determining one or more motion vectors for one or more regions in a first image frame of a stream of image frames, where the one or more motion vectors represent motion of the one or more regions from a previous image frame in the stream of image frames, and modifying screen space positions associated with at least a portion of the set of vertices within the texture based at least in part on the one or more motion vectors. The code also includes code for rendering, by a graphics processing unit (GPU), the first image frame into the texture, such that a pixel position of one or more pixels in the image frame are moved based at least in part on the screen space positions of at least the portion of the set of vertices within the texture as modified, to generate an extrapolated image frame, and displaying the extrapolated image frame after the first image frame and before a next image frame in the stream of image frames.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
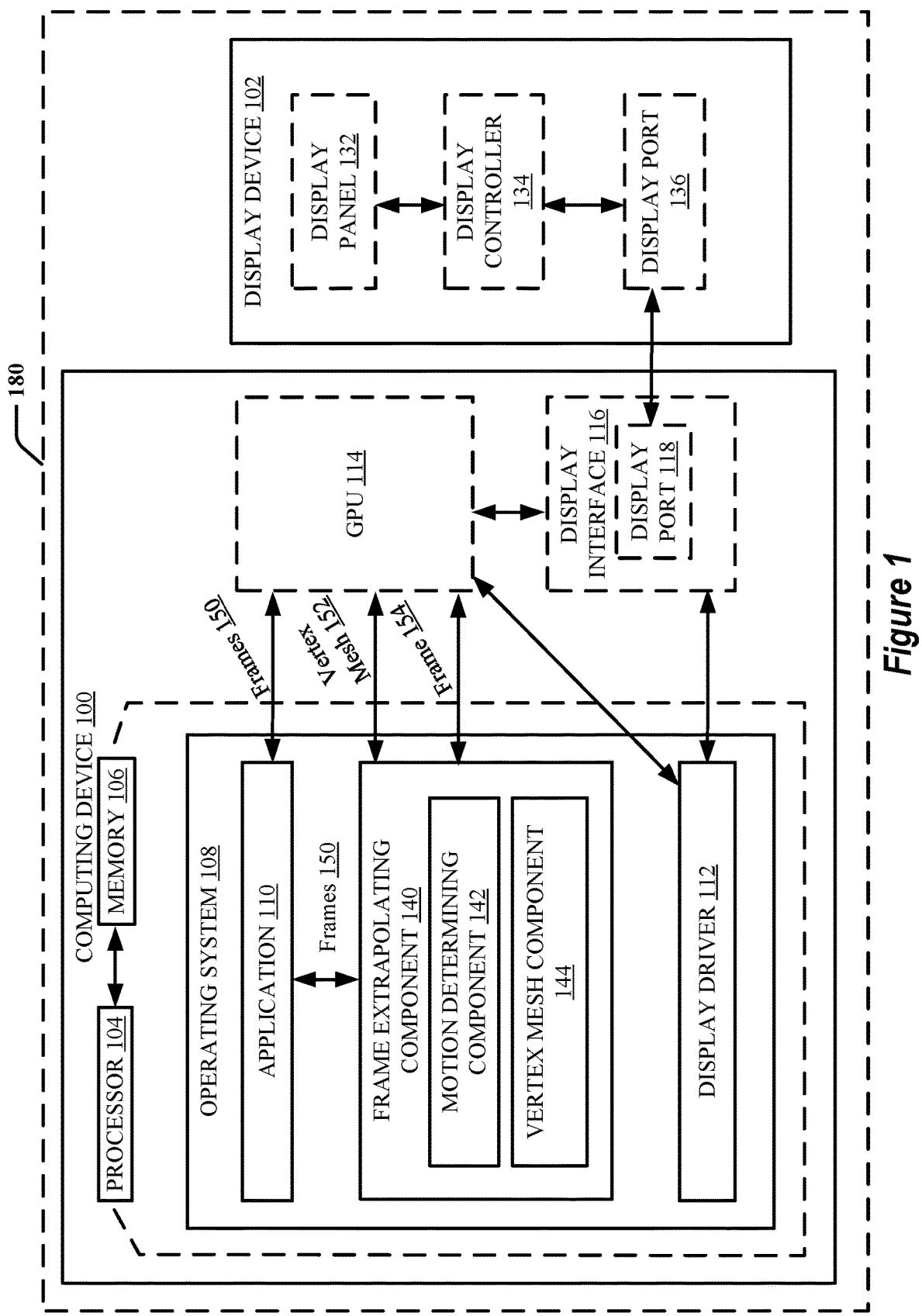
FIG. 1 is a schematic diagram of an example of a computing device and display device communicatively coupled for displaying images in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to extrapolating images for inserting into a stream of image frames for display on a display device to achieve an increased frame rate. For example, the image frames can correspond to images, also referred to as scenes, drawn by an application and provided, as a set of rendering instructions, to a processor, such as a graphics processing unit (GPU) for rendering on a display device. According to examples described herein, an image frame can be extrapolated based on determining motion related to one or more regions of the image frame, as discerned from one or more previous image frames in the stream of image frames. For example, based on the determined motion, regions of the image frame can be moved in the extrapolated image frame in the direction of the motion, and the extrapolated image frame can be inserted after a current image frame and before a next image frame in the stream of image frames (e.g., before the next image frame is rendered) to achieve the increased frame rate. In this regard, a viewing experience for the stream of image frames can be improved by displaying the extrapolated image frame with some change from the current image frame and before the next image frame, where the change relates to detected motion in the previous image frames.

In an example, a vertex mesh including a set (e.g., a grid) of vertices can be defined and mapped to a texture, where the texture can be or can include a texture used by a GPU to distort (e.g., rotate, resize, etc.) or otherwise modify an image. Motion can be determined for one or more regions of an image frame, and can be applied to the vertices to move one or more of the vertices to different positions in the texture based on the motion. For example, the motion can be determined based at least in part on detecting movement of certain regions of an image frame (e.g., objects, collections of pixels, etc. in the image) across a stream of one or more image frames, where the image frames in the stream can correspond to a similar scene in content (e.g., a similar point-of-view in a game, a similar scene in a video stream, etc.), and accordingly applied to vertices in positions similar to the regions of the image for which the motion is detected. The extrapolated image frame can be generated by rendering an image frame into the texture such that pixel positions of one or more pixels in the image frame are moved based on the defined movement of the vertices.

Where rendering the image frame into the texture is performed on a GPU, for example, inherent properties of the rendering into the texture may handle movement of corresponding pixels of the image frame based on functionality of the GPU. For example, pixels behind the pixels that are moved as a result of the motion, and/or pixels that are otherwise uncovered by the motion, can be filled with colors from other neighboring (or adjacent) pixels. In other examples, however, the scene represented by the image frame may include multiple objects with specified depth information. In this example, inherent properties of the rendering may cause pixels behind or uncovered by the motion to be filled with colors from one or more previously covered objects at a deeper depth than the object in the region of the image frame being moved based on the motion. Thus, the one or more previously covered objects can become at least partially occluded based on movement of the pixels of the object in the region of the image frame being moved from a position blocking the previously covered object to another position in the scene. In the above examples, using the vertex mesh as a texture for distorting the image frame in this regard provides an efficient and effective mechanism for generating extrapolated image frames using inherent properties of a GPU.

Figure 2:
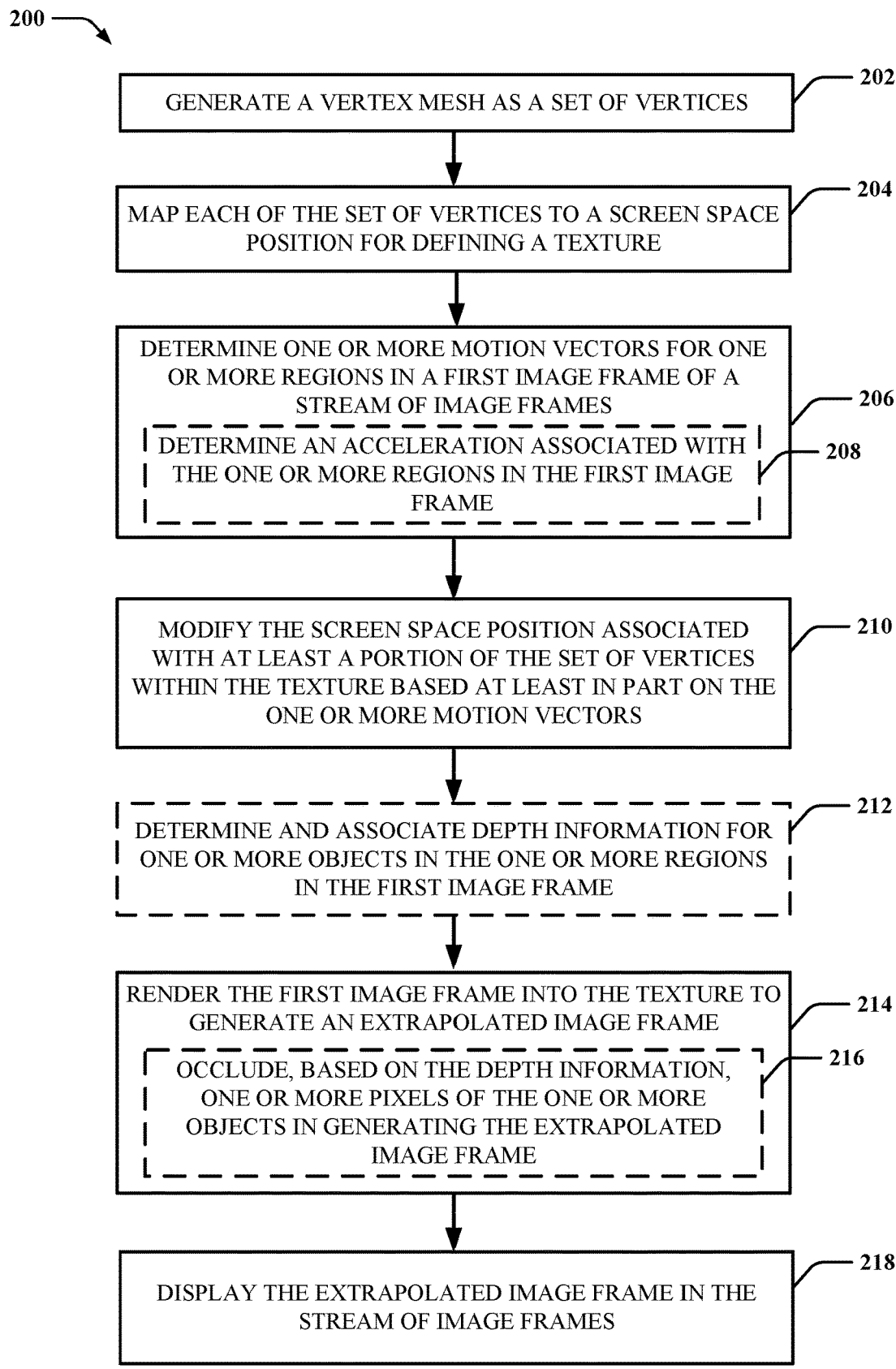
FIG. 2 is a flow diagram of an example of a method for rendering extrapolated image frames in accordance with examples described herein.

Turning now to FIGS. 1-5, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100, display device 102, and/or related components, which can communicate image data for displaying images on the display device 102. For example, the display device 102 may be an internal display that is within the same housing 180 as computing device 100, a display device that is external to computing device 100, and/or the like. In addition, for example, display device 102 may be coupled to computing device 100 via a display port, a wired or wireless network connection, etc. Display device 102 can be capable of displaying a two-dimensional display, such as a desktop, a three-dimensional world, etc.

For example, computing device 100 can include or can otherwise be coupled with a processor 104 and/or memory 106, where the processor 104 and/or memory 106 can be configured to execute or store instructions or other parameters related to communicating image data to the display device 102 for displaying, as described herein. Computing device 100 can execute an operating system 108 (e.g., via processor 104 and/or memory 106) for providing an environment for executing one or more applications 110, such as one or more applications 110 that produce or otherwise obtain images for display by the display device 102. For example, the computing device 100 can include a VR device, and additionally, the one or more applications 110 can be one or more VR applications operable to cause the generation of VR images on the display device 102 of the VR device. In other examples, the applications 110 can include substantially any application that generates streams of images for displaying on the display device 102 at a certain frame rate, such as a game, a video streaming service, etc. The operating system 108 can also include a display driver 112 for communicating with a GPU 114 and/or with a display interface 116 of the computing device 100 (e.g., directly or via GPU 114) to cause rendering of one or more images for display on the display device 102.

In an example, display interface 116 can be communicatively coupled with the processor 104 and/or memory 106 for communicating with the display device 102 via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and display device 102.

For example, display device 102 can include a display panel 132 for displaying one or more images based on signals received from a display controller 134. For example, the display panel 132 can include a liquid crystal display (LCD) (which can include a light emitting diode (LED) backlit LCD display), organic LED (OLED) display, digital light processing (DLP) display, etc. Display device 102 can include, but is not limited to, a head-mounted display having a single display panel or multiple display panels (e.g., one for each of two eyes) to view on the head-mounted display, a monitor, a television, a projector, or substantially any type of embedded, external, wireless, etc., display configured for communicating with computing device 100 via an embedded, external, or wireless display port 136. As mentioned, display controller 134 provides signals to the display panel 132 to cause display of images. In an example, display controller 134 can include a printed circuit board (PCB), programmable logic controller (PLC), etc., coupled with the display panel 132 to control the display panel 132 to display images based on commands received via display port 136. Thus, for example, display controller 134 can be or can include a processor configured for sending the signals to the display panel 132 based on image data (e.g., rendered image frames) received via display port 136.

In an example, computing device 100 can generate image data for providing to the display device 102 for displaying one or more images on display panel 132. Computing device 100 can accordingly communicate the image data to the display device 102 via display interface 116 using display port 118 to communicate signals corresponding to the image data to display port 136 for providing to display controller 134. In an example, operating system 108 and/or application 110 can obtain or otherwise generate images for displaying on display device 102, and display driver 112 can provide rendering instructions for rendering the images to GPU 114 (e.g., via display interface 116 or otherwise). In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions from the display driver 112 executing on the processor 104 (e.g., via the operating system 108) to the GPU 114. GPU 114 can process the rendering instructions to render an image, and can initiate display of at least a portion of the image on the display device 102 by transmitting associated signals to the display device 102 via display port 118 of display interface 116. The display device 102 can receive the signals generated by the GPU 114, and display controller 134 can accordingly cause display panel 132 to draw or display the image based on the signals.

The application 110 can function to display a stream of image frames 150 on the display device 102 in a virtual reality or other first-person environment, in a game, a video stream, etc., for example. In this regard, the application 110 (and/or operating system 108) can render each of the stream of image frames 150 for display on display device 102 by providing the image frames and/or corresponding rendering instructions (e.g., via display driver 112 or otherwise) to GPU 114 for rendering. In an example, the application 110 may render image frames at a frame rate that is less than that supported by the display device 102. For example, the frame rate at which the application 110 renders image frames (e.g., due to limitations in processor 104 or GPU 114 hardware, available memory 106, etc. to generate the images) can be half of a frame rate supported by the display device 102 (e.g., the application 110 can render images at 30 frames per second (fps) where the display device 102 supports 60 fps, 45 fps where the display device 102 supports 90 fps, 60 fps where the display device 102 supports 120 fps, etc.). In this regard, frame extrapolating component 140, which may be part of the application 110, operating system 108, display driver 112, etc., can extrapolate one or more image frames based on the stream of image frames 150 for inserting in the stream of image frames 150 to achieve the frame rate supported by the display device 102.

For example, frame extrapolating component 140 can include a motion determining component 142 for computing motion of one or more regions of a scene across multiple image frames in time (e.g., across a current and one or more previous image frames), and a vertex mesh component 144 for generating a vertex mesh 152 that is provided to the GPU 114 for applying as a texture. In this regard, for example, vertex mesh component 144 may provide the vertex mesh 152 to the GPU 114 along with screen space positions of the texture that can be mapped to each vertex in the vertex mesh 152. Based on motion detected by motion determining component 142, for example, vertex mesh component 144 can move the vertices of the vertex mesh 152 (e.g., before or after providing the vertex mesh 146 to the GPU 114), which may result in moving the screen space positions of the texture corresponding to the vertices. Frame extrapolating component 140, in this example, can also provide the GPU 114 with an image frame 154, e.g., taken from the stream of image frames 150, on which to apply the texture in rendering the extrapolated image frame such that movement of the vertices in the vertex mesh 152 results in movement of regions of the image frame (e.g., pixels corresponding to one or more objects in the image frame) to provide the effect of motion for the extrapolated image frame.

The GPU 114 can render the extrapolated image frame, which can be inserted (or rendered at a time) between a current image frame and a next image frame in the stream of image frames 150 to achieve the frame rate supported by the display device 102. In the examples described above, where the application 110 renders image frames at a frame rate that is one half of the frame rate supported by the display device 102, for example, frame extrapolating component 140 can perform this process to insert an extrapolated image frame between each image frame received from the application 110 to achieve twice the frame rate supported by the application 110, though additional frame rates can be supported from an initial image frame by inserting one or more extrapolated image frames, as generated, at associated positions (e.g., between some or all initial image frames) to achieve the desired frame rate. Moreover, in some examples described further herein, depth information can be included such that movement of regions of the image frame in the extrapolated image frame can cause occlusion of objects at a deeper depth in the image frame. In addition, in some examples described further herein, motion determining component 142 can determine acceleration, velocity, jerk, or substantially any derivative of movement, associated with the regions of the image frame based on multiple previous image frames to use in determining predicted motion for the extrapolated image frame.

FIG. 2 is a flowchart of an example of a method 200 for extrapolating image frames in a stream of image frames, based on detected object motion, to achieve a desired frame rate for rendering the stream of image frames. For example, method 200 can be performed by a computing device 100 and/or display device 102 communicatively coupled with one another, and is accordingly described with reference to FIG. 1, as a non-limiting example of an environment for carrying out method 200.

In method 200, at action 202, a vertex mesh can be generated as a set of vertices. In an example, vertex mesh component 144, e.g., in conjunction with processor 104, memory 106, frame extrapolating component 140, etc., can generate the vertex mesh as the set of vertices. For example, vertex mesh component 144 can define the set of vertices to create the mesh, such as by defining the set of vertices as a set of triangles, where two triangles can form a rectangle of the mesh. For example, for a given rectangle in the mesh, the set of vertices may include a triangle of (upper left corner, upper right corner, lower right corner) and (upper left corner, lower left corner, lower right corner). In one example, the vertices can each be assigned an index for defining the triangles/rectangles formed by the vertices.

At action 204, each of the set of vertices can be mapped to a screen space position for defining a texture. In an example, vertex mesh component 144, e.g., in conjunction with processor 104, memory 106, frame extrapolating component 140, etc., can map each of the set of vertices to a screen space position for defining the texture. For example, the set of vertices can be mapped in a two dimensional (2D) U, V coordinate space to define the texture, where the texture can be applied, by the GPU 114, to a three dimensional (3D) image defined in an X, Y, Z, coordinate space using UV mapping defined by the GPU 114 as is a 3D modeling process of projecting a 2D image to a 3D model's surface. In addition, for example, to the extent depth information for the image to be rendered (e.g., the depth buffer) may be available when the vertices are mapped to define the texture, vertex mesh component 144 can also add the depth information to the texture (e.g., additionally or alternatively to determining/associating depth information at action 212 below), as the Z coordinates, to enable determination of occlusion when rendering the image into the texture.

Figure 3:
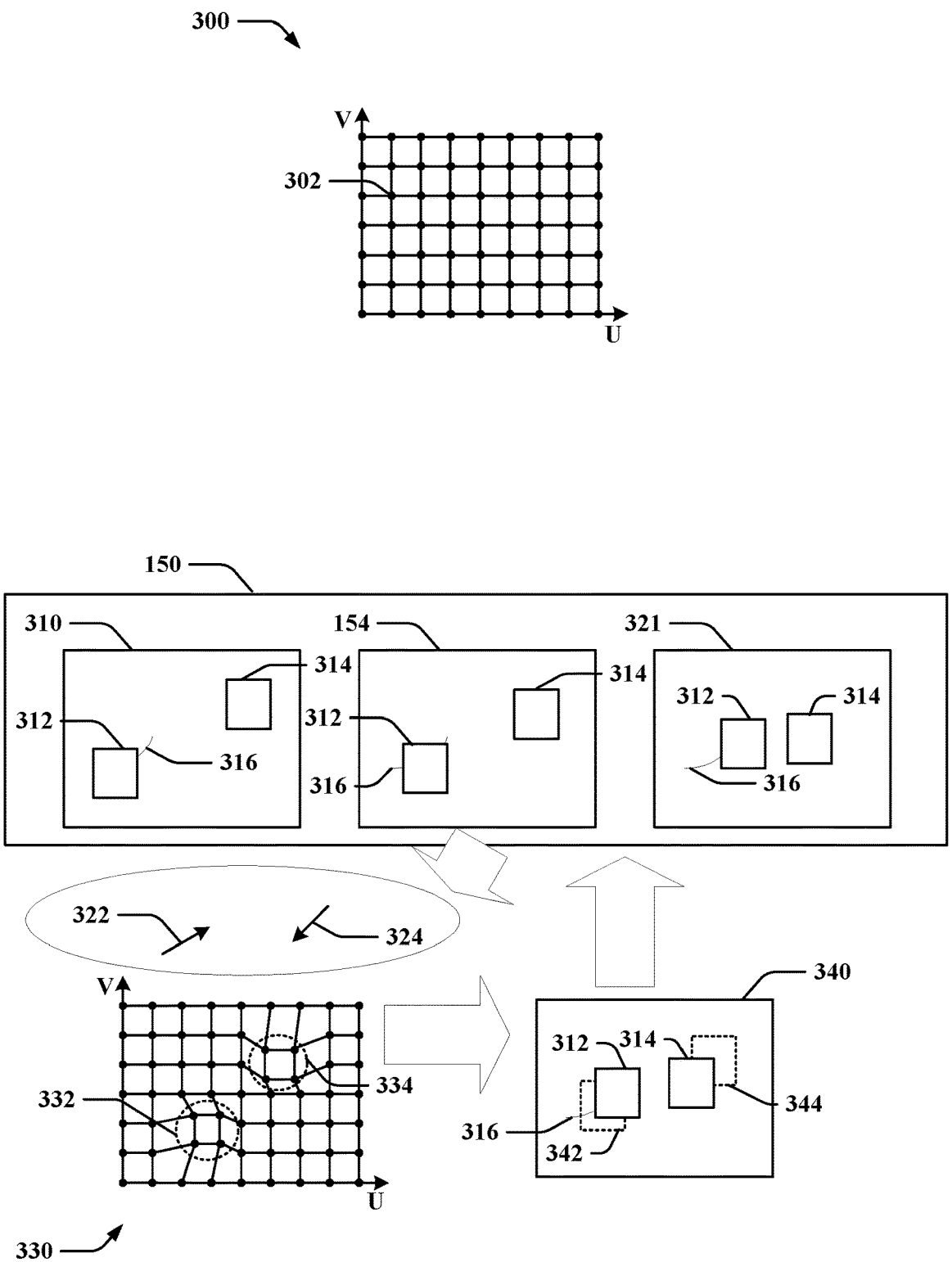
FIG. 3 illustrates schematic diagrams of examples of vertex meshes and image frames in accordance with examples described herein.

An example is shown in FIG. 3, which depicts a vertex mesh 300 as a mesh of vertices 302, mapped in the U, V coordinate space defining screen space positions for the vertices 302. For example, the screen space positions may correspond to pixels on a screen of the display device 102 (e.g., pixels corresponding to a supported resolution of the display device 102 that can be known by the GPU 114 and utilized in rendering image frames for display on the display device 102), and the vertices 302 may be mapped to one or more of the pixels. In one example, each vertex 302 can map to a given pixel. In other examples, the vertices 302 may be mapped to a collection of multiple pixels such that the set of vertices 302 in the vertex mesh 300 define more coarse regions than per pixel. In any case, vertex mesh component 144 can generate the mesh and associate the vertices 302 to screen space positions for defining the texture to be used by the GPU 114 for applying to an image frame, as described further herein.

At action 206, one or more motion vectors can be determined for one or more regions in a first image frame of a stream of image frames. In an example, motion determining component 142, e.g., in conjunction with processor 104, memory 106, frame extrapolating component 140, etc., can determine the one or more motion vectors for the one or more regions in the first image frame of the stream of image frames. For example, motion determining component 142 can infer motion using one or more mechanisms. In one example, given an image frame, such as a current image frame to be rendered by the GPU 114, motion determining component 142 can detect motion of one or more regions of the image from at least one previous image frame in the stream of image frames 150. For example, motion determining component 142 can perform pixel comparison among the current image frame and previous image frame to determine the motion of the region of the image (e.g. by detecting similar groups of pixels at different positions in the image frames). Effectively, for example, the detected regions of the image may correspond to objects in the image, where the object is determined to have similar pixel values in a detected group of pixels that have moved within the image frame from one image frame (the previous image frame) to another (the current image frame). In other examples, motion determining component 142 can receive the motion information from the application 110, as the application may know where objects are moving based on rendering previous frames.

Based on the detected movement, for example, motion determining component 142 can generate one or more motion vectors that represent a direction and/or distance (e.g., in pixels) of the detected movement, where the one or more motion vectors can also relate to a region of the image frame. In one example, the one or more motion vectors can represent the actual motion from the previous image frame to the current image frame or can represent predicted motion for the next image frame based on the detected motion between the previous image frame and the current image frame. For example, FIG. 3 additionally depicts a stream of image frames 150 including an image frame 310 with an object 312, an object 314, and an object 316 covered by object 312. FIG. 3 also depicts an image frame 154, which can be a current image frame in the stream of image frames 150 (with image frame 310 being a previous image frame in the stream of image frames 150), where the objects 312 and 314 have moved in screen space position from the previous image frame 310 to the current image frame 154. In this example, object 312 can have moved in a direction 322, and object 314 can have moved in a direction 324 between the previous image frame 310 and the current image frame 154. Thus, motion determining component 142 can generate a motion vector in the direction 322 and a motion vector in the direction 324 corresponding to regions of the previous image frame 310 or regions of the current image frame 154 associated with the objects 312, 314 to represent actual or predicted motion of the objects 312, 314. Additionally, motion determining component 142 can generate the motion vectors to indicate distance information related to the actual or predicted motion in the specified direction. Other considerations can impact the motion vector generation for predicting motion as well, such as scene-specific considerations (e.g., regarding how much the objects are able to move in the scene).

Optionally, determining the one or more motion vectors at action 206 may also include, at action 208, determining an acceleration associated with the one or more regions in the first image frame. In an example, motion determining component 142, e.g., in conjunction with processor 104, memory 106, frame extrapolating component 140, etc., can determine the acceleration associated with the one or more regions of the first image frame. For example, motion determining component 142 can analyze multiple previous frames to determine or otherwise compute the acceleration related to motion of the one or more regions of the image frame across the multiple previous frames. Using the acceleration in generating the motion vectors may facilitate determining a more accurate prediction of a position of an object corresponding to the region of the image frame in a next image frame (e.g., based on the position in a previous image frame, the motion and acceleration observed in additional previous image frames). Additionally, or alternatively, other derivatives of motion or movement can be similarly used to generate motion vectors in this regard.

In addition, though determining the motion vectors is described as based on the current image frame, the motion vectors can be determined based on detecting motion and/or acceleration in previous image frames not including the current image frame, in some examples. Moreover, determining the motion vectors at action 206 can include motion determining component 142 receiving motion vectors from another component, such as application 110, etc.

At action 210, the screen space position associated with at least a portion of the set of vertices within the texture can be modified based at least in part on the one or more motion vectors. In an example, vertex mesh component 144, e.g., in conjunction with processor 104, memory 106, frame extrapolating component 140, etc., can modify the screen space position associated with at least the portion of the set of vertices within the texture based at least in part on the one or more motion vectors. For example, vertex mesh component 144 can move the screen space position of vertices associated with the determined motion to predict a screen space position of regions of the image (e.g., objects) associated with the vertices for generating an extrapolated image frame. For example, given the one or more motion vectors applied in the screen space, vertex mesh component 144 can move vertices in the area of the one or more motion vectors based on the motion to tweak the screen space position of the vertices. In addition, for example, the motion vectors may relate to a predicted motion of the one or more regions in the next image frame, and thus may be applied to a lesser extent (e.g., half of the indicated distance) for generating the extrapolated image frame for insertion before the next image frame in the stream of image frames before the next image frame is generated.

Referring again to FIG. 3, vertex mesh component 144 can modify at least a portion of the screen space positions of the set of vertices 302 in vertex mesh 300 based on the motion vectors to generate vertex mesh 330. In vertex mesh 330, the screen space positions in the U, V coordinate space that are associated with the vertices 332 are moved based on the motion detected in the direction 322, and screen space positions that are associated with the vertices 334 are moved based on the motion detected in the direction 324. For example, vertex mesh component 144 can apply the one or more determined motion vectors to the set of vertices to move screen space positions of the vertices at a position near object 312 in the direction 322 (and/or based on the corresponding distance), where the set of vertices can correspond to those in a similar screen space position as the object 312 either in the previous image frame 310 or the current frame 154. Similarly, the set of vertices at a position near object 314 can be moved in the direction 324 (and/or based on the corresponding distance). For example, moving the vertices to difference screen space positions in this regard can occur for the texture. In one example, vertex mesh component 144 can instruct the GPU 114 to move the vertices in the vertex mesh 152 by using a shader to move the screen space positions corresponding to the vertices, which can cause distortion to a portion of the image laid over the texture at the positions of the moved vertices. For example, the shader can correspond to a vertex shader used by GPUs 114 to transform a vertex's 3D position in virtual space to a 2D coordinate in the screen space, one or more compute shaders with logic to transform the vertices, etc. In another example, the vertex mesh component 144 can perform the movement prior to communicating the vertex mesh 152 to the GPU 114, such that vertex mesh component 144 can indicate the vertex mesh 152 and altered screen space positions for each vertex to GPU 114 to define the texture.

Optionally, at action 212, depth information can be determined and associated for one or more objects in the one or more regions in the first image frame. In an example, frame extrapolating component 140, e.g., in conjunction with processor 104, memory 106, etc., can determine and associate the depth information for the one or more objects in the one or more regions in the first image frame. In an example, the depth information can be provided by the application 110 on a per object basis, and frame extrapolating component 140 can accordingly determine the depth information for each associated region of the image frame, and can associate the depth information with the region of the image frame for providing the image frame to the GPU 114 for generating the extrapolated image frame. As described further herein, in generating the extrapolated image frame, the depth information can facilitate selection of pixel attributes where the determined motion causes movement of certain pixels in certain regions of the image frame.

At action 214, the first image frame can be rendered into the texture to generate the extrapolated image frame. In an example, GPU 114, e.g., in conjunction with processor 104, memory 106, frame extrapolating component 140, etc., can render the first image frame into the texture to generate the extrapolated image frame. For example, as described, frame extrapolating component 140 can provide the vertex mesh 152 for generating the texture to the GPU 114, and can provide the first image frame. Thus, the GPU 114 can generate the extrapolated image frame from the first image frame at least in part by applying the texture thereto. The texture, as described, can cause stretching or moving of some regions in the image based on the detected motion in previous image frames to provide the appearance of additional motion in the extrapolated image frame. In one example, pixels that are in and/or near the moved regions of the image frame can take on different properties based on the motion, where the properties may be determined based on neighboring pixel properties. For example, pixels within a moved region may inherit properties of pixels behind the motion.

In the example shown in FIG. 3, for instance, the GPU 114 can generate the extrapolated image frame 340 by applying the texture represented by vertex mesh 330 to the current image frame 154. In this example, applying the texture to the current image frame 154 can cause, in extrapolated image frame 340, distortion of the object 312 further in the direction 322 and distortion of the object 314 further in the direction 324. In this regard, the GPU 114 can back fill pixels corresponding to the original region 342 of the object 312, that do not intersect the moved object 312, based on properties of neighboring pixels, properties of the moved pixels, etc., and can similarly back fill pixels corresponding to the original region 344 of the object 314, that do not intersect the moved object 314.

Figure 4:
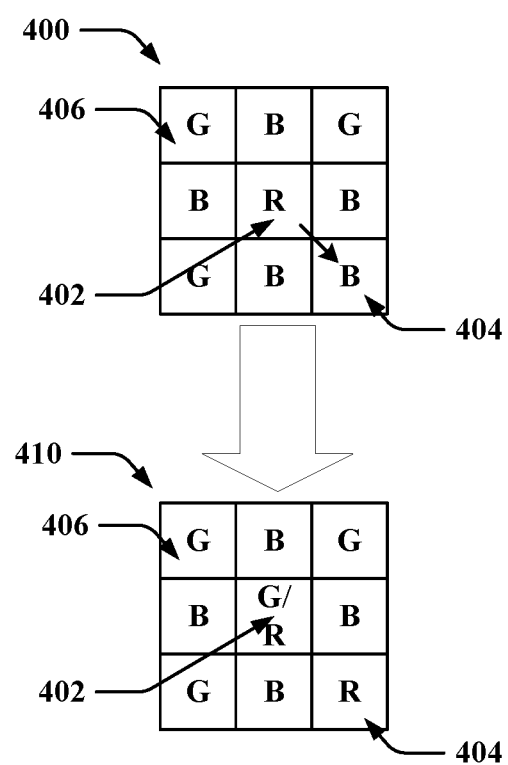
FIG. 4 illustrates schematic diagrams of examples of collections of pixels in accordance with examples described herein.

An example is illustrated in FIG. 4, which depicts a collection of pixels 400, including pixels 402, 404, 406, and other pixels. In this example, based on motion detected by a motion vector, the collection of pixels can be modified to generate a modified collection of pixels 410 where pixel 402 moves to pixel 404 (e.g., pixel 404 takes on the properties, in this case Red (R) color, of pixel 402). In this example, the moved pixel 402 can be back filled with properties of its original pixel (e.g., the same or similar to properties of pixel 404, or R color) or with properties from pixel 406 behind the motion (e.g., green (G) color). In an example, the GPU 114 can determine the properties for pixel 404 based on whether the pixel intersects (or an extent to which the pixel intersects) an object that is subject to the motion.

Optionally, rendering the first image frame into the texture at action 214 may include, at action 216, occluding, based on the depth information, one or more pixels of the one or more objects in generating the extrapolated image frame. In an example, GPU 114, e.g., in conjunction with processor 104, memory 106, frame extrapolating component 140, etc., can occlude, based on the depth information, the one or more pixels of the one or more objects in generating the extrapolated image frame. For example, frame extrapolating component 140, as described, may provide the GPU 114 with the depth information for one or more regions of the image frame (e.g., current image frame 154) or one or more associated objects in the image frame. GPU 114 can use this information in rendering the image frame 154 and/or the extrapolated image frame 340 such to occlude portions of the one or more objects in pixels that have been moved based on the determined motion vectors. Referring to FIG. 3, for example, where motion is predicted for object 312 based on the texture generated from the motion vector(s), the GPU 114 can move the object 312 in the extrapolated image frame 114 to occlude portions of the object 316 that were previously visible (e.g., by setting properties of the pixels occluded by the motion of the foreground object 312 to those of the occluding foreground object 312). This can be accomplished, for example, by applying the texture created from the vertex mesh and depth information, using a shader as described above, to allow the GPU 114 to fill the pixels to which the object 312 is moved with pixels of the object 312 (e.g., instead of using pixels of object 316) based on the depth information for the objects. In addition, as described previously, GPU 11 may (e.g., by virtue of using the shader or otherwise) back fill pixels corresponding to the original region 342 of the object 312, that do not intersect the moved object 312, based on properties of neighboring pixels (e.g., pixels from object 316 or other objects), properties of the moved pixels (e.g., pixels of object 312), and/or the like.

At action 218, the extrapolated image frame can be displayed in the stream of image frames. In an example, display device 120, e.g., in conjunction with GPU 114, display interface 116, display port 118, 136, display controller 134, display panel 132, etc., can display the extrapolated image frame in the stream of image frames. For example, GPU 114 can render and cause display of the extrapolated image frame 340 in the stream of image frames 150 between the current image frame 154 and the next image frame 321 (e.g., before the next image frame 312 is rendered or generated). In an example, application 110 can provide the stream of image frames, including image frames 310, 154, 321, to GPU 114 for rendering at the first frame rate specified by the application 110, and GPU 114 can accordingly render the image frames 310, 154, 321 for display on display device 102 at the first frame rate. In addition, application 110 can provide the stream of image frames 150, or at least a portion thereof, to frame extrapolating component 140 to cause generation of extrapolated image frames for rendering in between one or more of the image frames 310, 154, image frames 154, 321, etc. to achieve a supported frame rate of the display device 102. In an example, generating the extrapolated image frames by the GPU 114 can be performed between generating of image frames by the application 110 to provide efficient and orthogonal processing of the extrapolated image frames without impacting generating of the original stream of image frames 150. In addition, displaying the extrapolated image frame can provide the appearance of motion in fulfilling the frame rate achievable by the display device 102.

Figure 5:
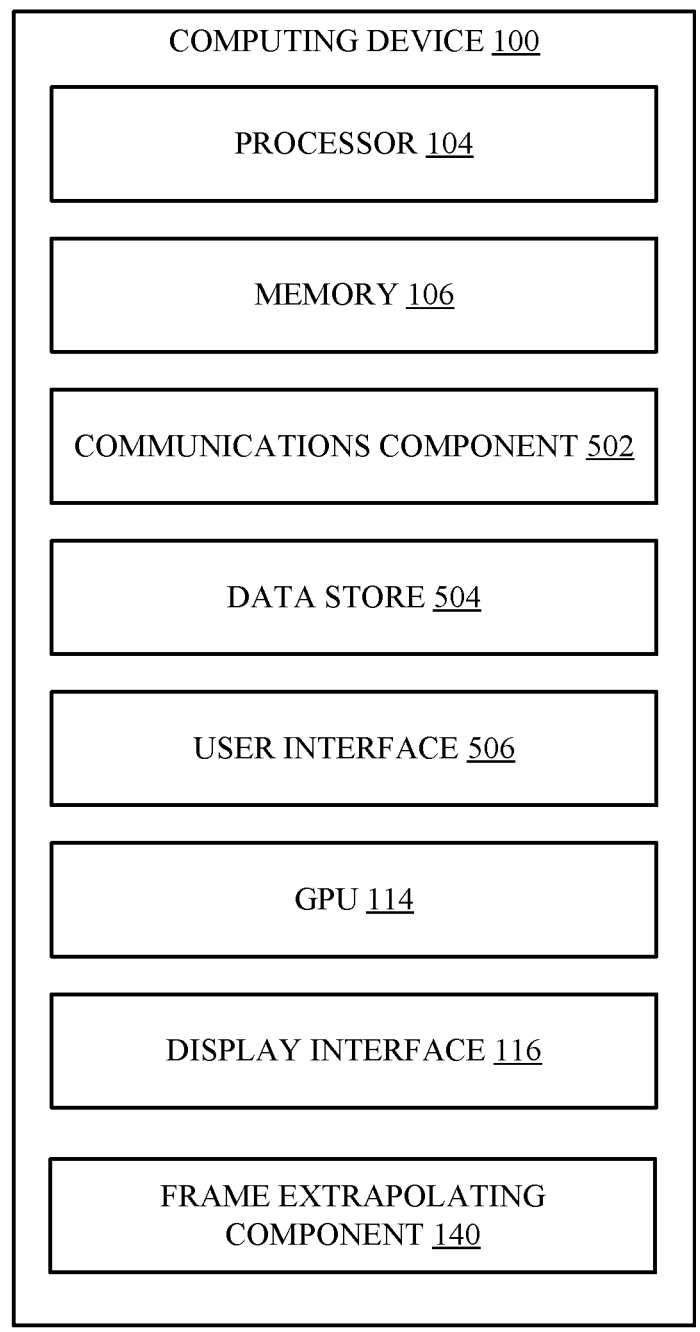
FIG. 5 is a schematic diagram of an example of a computing device for performing functions described herein.

FIG. 5 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, display drivers, etc., as described herein, and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices.

Additionally, computing device 100 may include a data store 504, which can be any suitable combination of hardware and/or software, that provides for mass storage of information, databases, and programs employed in connection with examples described herein. For example, data store 504 may be or may include a data repository for applications and/or related parameters not currently being executed by processor 104. In addition, data store 504 may be a data repository for an operating system, application, display driver, etc. executing on the processor 104, and/or one or more other components of the computing device 100.

Computing device 100 may also include a user interface component 506 operable to receive inputs from a user of computing device 100 and further operable to generate outputs for presentation to the user (e.g., via display interface 116 to a display device). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface 116, a speaker, a haptic feedback mechanism, a printer, any other mechanism capable of presenting an output to a user, or any combination thereof.

Computing device 100 can also include a GPU 114, as described herein, for rendering frames based on rendering instruction received from processor 104. GPU 114 can additional send signals via a display interface 116 to cause display of the rendered frames on a display device. Additionally, computing device 100 may include a frame extrapolating component 140, as described herein, to generate a vertex mesh for creating an extrapolated image frame by applying a corresponding texture to an image frame, which can be rendered in a stream of image frames.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for performing frame extrapolation in image frame rendering, comprising:
   generating a vertex mesh as a set of vertices;
   mapping each vertex in the set of vertices to a screen space position for defining a texture;
   determining one or more motion vectors for one or more regions in a first image frame of a stream of image frames, wherein the one or more motion vectors represent motion of the one or more regions from a previous image frame in the stream of image frames;
   dividing the first image frame into areas to be modified based on the motion vectors;
   modifying screen space positions associated with at least a portion of the set of vertices within the areas to be modified based at least in part on the one or more motion vectors;
   rendering, by a graphics processing unit (GPU), the first image frame into the texture, such that a pixel position of one or more pixels in the first image frame are moved based at least in part on the screen space positions of at least the portion of the set of vertices within the texture as modified, to generate an extrapolated image frame, wherein movement of corresponding pixels of the first image frame are determined by properties of the modified screen space positions based on functionality of the GPU; and
   displaying the extrapolated image frame after the first image frame and before a next image frame in the stream of image frames.

2. The method of claim 1, further comprising:
   determining depth information for one or more objects in the first image frame; and
   associating the depth information with at least a portion of the screen space positions that are determined to correspond to a position of the one or more objects in the first image frame.

3. The method of claim 2, wherein rendering the first image frame into the texture is further based at least in part on the depth information.

4. The method of claim 3, wherein rendering the first image frame based at least in part on the depth information comprises occluding, based on the depth information, one or more pixels of the one or more objects in generating the extrapolated image frame.

5. The method of claim 1, wherein rendering the first image frame into the texture results in one or more original pixels, corresponding to at least one of the one or more regions in the first image frame, inheriting properties of the one or more original pixels in generating the extrapolated image frame.

6. The method of claim 1, wherein rendering the first image frame into the texture results in one or more original pixels, corresponding to at least one of the one or more regions in the first image frame, inheriting properties of one or more adjacent pixels that are adjacent to the original pixel in generating the extrapolated image frame.

7. The method of claim 1, wherein determining the one or more motion vectors is based at least in part on determining an acceleration computed from motion of the one or more regions of the image frame between multiple previous image frames in the stream of image frames.

8. The method of claim 1, wherein modifying screen space positions associated with at least a portion of the set of vertices within the texture comprises applying a shader to modify the screen space positions based at least in part on the one or more motion vectors.

9. A computing device for performing frame extrapolation in image frame rendering, comprising:
  a memory storing one or more parameters or instructions for executing an operating system and one or more applications;
  a display interface coupled with a display device for communicating signals to display images on the display device; and
  at least one processor coupled to the memory and the display interface, wherein the at least one processor is configured to:
    generate a vertex mesh as a set of vertices;
    map each vertex in the set of vertices to a screen space position for defining a texture;
    determine one or more motion vectors for one or more regions in a first image frame of a stream of image frames, wherein the one or more motion vectors represent motion of the one or more regions from a previous image frame in the stream of image frames;
    divide the first image frame into areas to be modified based on the motion vectors;
    modify screen space positions associated with at least a portion of the set of vertices within the areas to be modified based at least in part on the one or more motion vectors;
    render, by a graphics processing unit (GPU), the first image frame into the texture, such that a pixel position of one or more pixels in the first image frame are moved based at least in part on the screen space positions of at least the portion of the set of vertices within the texture as modified, to generate an extrapolated image frame, wherein movement of corresponding pixels of the image first frame are determined by properties of the modified screen space positions based on functionality of the GPU; and
    display the extrapolated image frame after the first image frame and before a next image frame in the stream of image frames.

10. The computing device of claim 9, wherein the at least one processor is further configured to:
  determine depth information for one or more objects in the first image frame; and
  associate the depth information with at least a portion of the screen space positions that are determined to correspond to a position of the one or more objects in the first image frame.

11. The computing device of claim 10, wherein the GPU renders the first image frame into the texture further based at least in part on the depth information.

12. The computing device of claim 11, wherein the GPU renders the first image frame based at least in part on the depth information by occluding, based on the depth information, one or more pixels of the one or more objects in generating the extrapolated image frame.

13. The computing device of claim 9, wherein rendering, by the GPU, the first image frame into the texture, results in one or more original pixels, corresponding to at least one of the one or more regions in the first image frame, inheriting properties of the one or more original pixels in generating the extrapolated image frame.

14. The computing device of claim 9, wherein rendering, by the GPU, the first image frame into the texture results in one or more original pixels, corresponding to at least one of the one or more regions in the first image frame, inheriting properties of one or more adjacent pixels that are adjacent to the original pixel in generating the extrapolated image frame.

15. The computing device of claim 9, wherein the at least one processor is configured to determine the one or more motion vectors based at least in part on determining an acceleration computed from motion of the one or more regions of the image frame between multiple previous image frames in the stream of image frames.

16. The computing device of claim 9, wherein the at least one processor is configured to modify the screen space positions associated with at least a portion of the set of vertices within the texture based at least in part on applying a shader to modify the screen space positions based at least in part on the one or more motion vectors.

17. A non-transitory computer-readable medium, comprising code executable by one or more processors for performing frame extrapolation in image frame rendering, the code comprising code for:
  generating a vertex mesh as a set of vertices;
  mapping each vertex in the set of vertices to a screen space position for defining a texture;
  determining one or more motion vectors for one or more regions in a first image frame of a stream of image frames, wherein the one or more motion vectors represent motion of the one or more regions from a previous image frame in the stream of image frames;
  dividing the first image frame into areas to be modified based on the motion vectors;
  modifying screen space positions associated with at least a portion of the set of vertices within the areas to be modified based at least in part on the one or more motion vectors;
  rendering, by a graphics processing unit (GPU), the first image frame into the texture, such that a pixel position of one or more pixels in the first image frame are moved based at least in part on the screen space positions of at least the portion of the set of vertices within the texture as modified, to generate an extrapolated image frame, wherein movement of corresponding pixels of the first image frame are determined by properties of the modified screen space positions based on functionality of the GPU; and
  displaying the extrapolated image frame after the first image frame and before a next image frame in the stream of image frames.

18. The non-transitory computer-readable medium of claim 17, the code further comprising code for:

determining depth information for one or more objects in the first image frame; and associating the depth information with at least a portion of the screen space positions that are determined to correspond to a position of the one or more objects in the first image frame.

19. The non-transitory computer-readable medium of claim 18, wherein the code for rendering renders the first image frame into the texture based at least in part on the depth information.

20. The non-transitory computer-readable medium of claim 19, wherein the code for rendering renders the first image frame based at least in part on the depth information at least in part by occluding, based on the depth information, one or more pixels of the one or more objects in generating the extrapolated image frame.

* * * * *